US011348570B2

(12) United States Patent
Liu

(10) Patent No.: US 11,348,570 B2
(45) Date of Patent: May 31, 2022

(54) METHOD FOR GENERATING STYLE STATEMENT, METHOD AND APPARATUS FOR TRAINING MODEL, AND COMPUTER DEVICE

(71) Applicant: TENCENT TECHNOLOGY (SHENZHEN) COMPANY LIMITED, Shenzhen (CN)

(72) Inventor: Xiaojiang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 129 days.

(21) Appl. No.: 16/589,811

(22) Filed: Oct. 1, 2019

(65) Prior Publication Data
US 2020/0035220 A1    Jan. 30, 2020

Related U.S. Application Data

(63) Continuation of application No. PCT/CN2018/101180, filed on Aug. 17, 2018.

(30) Foreign Application Priority Data

Sep. 12, 2017 (CN) .......................... 201710817322.9

(51) Int. Cl.
*G10L 15/06* (2013.01)
*G10L 15/183* (2013.01)
(Continued)

(52) U.S. Cl.
CPC .......... *G10L 15/063* (2013.01); *G10L 15/183* (2013.01); *G10L 15/22* (2013.01); *G10L 19/00* (2013.01)

(58) Field of Classification Search
USPC ...................... 704/8–10, 243, 257
See application file for complete search history.

(56) References Cited

U.S. PATENT DOCUMENTS 9,280,967 B2 *   3/2016   Fume ..................... G10L 13/10
2005/0149846 A1 *   7/2005   Shimizu ................ G06F 40/253
715/267
(Continued)

FOREIGN PATENT DOCUMENTS

CN      104750705 A      7/2015
CN      106469212 A      3/2017
(Continued)

OTHER PUBLICATIONS

L. Shang et al., "Neural responding machine for short-text conversation", In Proceedings of the 53rd Annual Meeting of the Association for Computational Linguistics and the 7th International Joint Conference on Natural Language Processing (vol. 1: Long Papers), 1577- 1586, Jul. 2015 10 pages.
(Continued)

Primary Examiner — Leonard Saint Cyr
(74) Attorney, Agent, or Firm — Anova Law Group, PLLC

(57) ABSTRACT

The present disclosure discloses a method for generating a styled sentence by a computer device. The method includes: obtaining a to-be-converted natural sentence, inputting the natural sentence into a first encoding model to filter style information in the natural sentence, and generating a target content vector corresponding to the natural sentence. The method also include determining, from at least one style vector according to a set target language style, a target style vector corresponding to the target language style; and inputting the target content vector and the target style vector into
(Continued)

a first decoding model, and generating a styled sentence corresponding to the natural sentence.

18 Claims, 6 Drawing Sheets

(51) Int. Cl.
   *G10L 15/22* (2006.01)
   *G10L 19/00* (2013.01)

(56) References Cited

U.S. PATENT DOCUMENTS

| | | | |
|---|---|---|---|
| 2012/0239390 A1* | 9/2012 | Fume | G10L 13/10 704/220 |
| 2014/0204116 A1* | 7/2014 | Maurer | G01C 21/3867 345/619 |
| 2016/0203819 A1 | 7/2016 | Ma et al. | |
| 2016/0269326 A1 | 9/2016 | Ji et al. | |
| 2018/0089164 A1* | 3/2018 | Iida | G06F 16/90332 |
| 2019/0147034 A1* | 5/2019 | Maneriker | G06N 5/022 704/9 |

FOREIGN PATENT DOCUMENTS

| | | |
|---|---|---|
| CN | 106528858 A | 3/2017 |
| CN | 106598921 A | 4/2017 |
| CN | 108304436 A | 7/2018 |
| EP | 3508991 A1 | 7/2019 |

OTHER PUBLICATIONS

O. Vinyals et al., "A neural conversational model", arXiv preprint arXiv:1506.05869, Jul. 22, 2015 8 pages.

I. Serban et al., "Building end-to-end dialogue systems using generative hierarchical neural network models", In Proceedings of the Thirtieth AAAI Conference on Artificial Intelligence, 3776-3783, 2016 8 pages.

S. Hochreiter et al., "Long short-term memory", Neural computation 9(8):1735-1780, 1997 32 pages.

J. Chung et al., "Empirical evaluation of gated recurrent neural networks on sequence modeling", arXiv preprint arXiv:1412.3555, Dec. 11, 2014 9 pages.

M. Arjovsky et al., Wasserstein gan, arXiv preprint arXiv:1701.07875, Dec. 6, 2017 32 pages.

The World Intellectual Property Organization (WIPO) International Search Report for PCT/CN2018/101180 dated Nov. 14, 2018 5 Pages (including translation).

The State Intellectual Property Office of the People's Republic of China (SIPO) Office Action 1 for 201710817322.9 dated May 10, 2019 6 Pages (including translation).

\* cited by examiner

METHOD FOR GENERATING STYLE STATEMENT, METHOD AND APPARATUS FOR TRAINING MODEL, AND COMPUTER DEVICE

RELATED APPLICATION

This application is a continuation application of PCT Patent Application No. PCT/CN2018/101180, filed on Aug. 17, 2018, which claims priority to Chinese Patent Application No. 201710817322.9, entitled "METHOD FOR GENERATING STYLE STATEMENT, METHOD AND APPARATUS FOR TRAINING MODEL, AND DEVICE" filed with the National Intellectual Property Administration, PRC on Sep. 12, 2017, which is incorporated by reference in its entirety.

FIELD OF THE TECHNOLOGY

The embodiments of this application relate to the field of natural language processing, and in particular, to a method for generating styled sentences, a method and an apparatus for training a model, and a computer device.

BACKGROUND

An intelligent dialogue system is configured to automatically generate a corresponding dialogue sentence according to chatting content input by a user, to implement a dialogue between a person and a machine. Currently, the intelligent dialogue system provides different language styles for a user to select and, according to a language style selected by the user, the intelligent dialogue system may generate a styled sentence having the language style. The language style is used to indicate a specific expression manner for expressing a natural sentence of a particular meaning. For example, the language style can be "fresh and elegant", "bright and plain", "flowery", "euphemistic and implicit", "spoken language-dominant", or the like.

In a method for generating a dialogue sentence, a parallel corpus is preset in the intelligent dialogue system. The parallel corpus includes a plurality of groups of sentence pairs. Different sentences in each group of sentence pairs are natural sentences having the same meaning but in different language styles.

When the intelligent dialogue system needs to generate a styled sentence having a language style, the intelligent dialogue system searches, in the parallel corpus, for a natural sentence having the language style, and encodes the natural sentence having the language style by using an encoding function, to obtain a sentence vector, and decodes the sentence vector by using a decoding function, to generate the styled sentence having the language style. For example, when an input sentence is "semantics x expressed by using a language style 1", "semantics x expressed by using a language style 1" is encoded by using an encoding function to obtain a sentence vector X, and the sentence vector X is a vector corresponding to "semantics x". If the intelligent dialogue system needs to generate a styled sentence having a language style of "spoken language dominant", the intelligent dialogue system only needs to search, in the parallel corpus, for a natural sentence having the language style according to the sentence vector X.

The parallel corpus may not include all language styles of a natural sentence. For example, for a natural sentence having "semantics x", when the parallel corpus does not have a natural sentence having the language style of "euphemistic and implicit", the intelligent dialogue system can only select a natural sentence of another language style, or select another natural sentence having the language style for sentence generation. However, such approach may cause problems, such as that the styled sentence generated by the intelligent dialogue system does not meet expectation of a user, and that the effect of style conversion is relatively poor.

SUMMARY

The embodiments of the present disclosure provide a method for generating a styled sentence, a method and an apparatus for training a model, and a computer device, to resolve the problem that a styled sentence having a target language style cannot be accurately generated when a natural sentence having the target language style selected by a user does not exist in a parallel corpus.

According to an aspect of the present disclosure, a method for generating a styled sentence by a computer device is provided. The method includes: obtaining a to-be-converted natural sentence, inputting the natural sentence into a first encoding model to filter style information in the natural sentence, and generating a target content vector corresponding to the natural sentence. The target content vector indicates a meaning of the natural sentence, and the style information indicates a language style of the natural sentence. The method also include determining, from at least one style vector according to a set target language style, a target style vector corresponding to the target language style; and inputting the target content vector and the target style vector into a first decoding model, and generating a styled sentence corresponding to the natural sentence.

According to another aspect of the present disclosure, a method for training a model by a computer device is provided. The model including a first encoding model and a first decoding model. The method includes inputting at least two natural training sentences in a corpus into a training model, and training a classification capability of a second encoding model by using the training model to obtain the first encoding model, each natural training sentence corresponding to a language style, and the classification capability being a capability of classifying the input natural training sentence into a corresponding content vector and style vector. The method also includes obtaining at least one style vector outputted by the first encoding model in a case that the first encoding model is obtained by training, each style vector being obtained by classifying the natural training sentence of a corresponding language style by the first encoding model; and training a restoration capability of a second decoding model by the training model to obtain the first decoding model in a case that the at least two natural training sentences are inputted into the training model. The restoration capability is a capability of restoring into the natural training sentence according to the content vector and the style vector, the content vector indicates a meaning of the natural training sentence, and the style vector indicates a language style of the natural training sentence.

According to another aspect of the present disclosure, a non-transitory computer-readable storage medium. The non-transitory computer-readable storage medium stores computer program instructions executable by at least one processor to perform: obtaining a to-be-converted natural sentence; inputting the natural sentence into a first encoding model to filter style information in the natural sentence, and generating a target content vector corresponding to the natural sentence, the target content vector indicating a meaning of the natural sentence, and the style information indicating a language style of the natural sentence; determining, from at least one style vector according to a set target language style, a target style vector corresponding to the target language style, each of the at least one style vector corresponding to a language style; and inputting the target content vector and the target style vector into a first decoding model, and generating a styled sentence corresponding to the natural sentence.

BRIEF DESCRIPTION OF THE DRAWINGS

To describe the technical solutions in the embodiments of the present disclosure more clearly, the following briefly describes the accompanying drawings for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
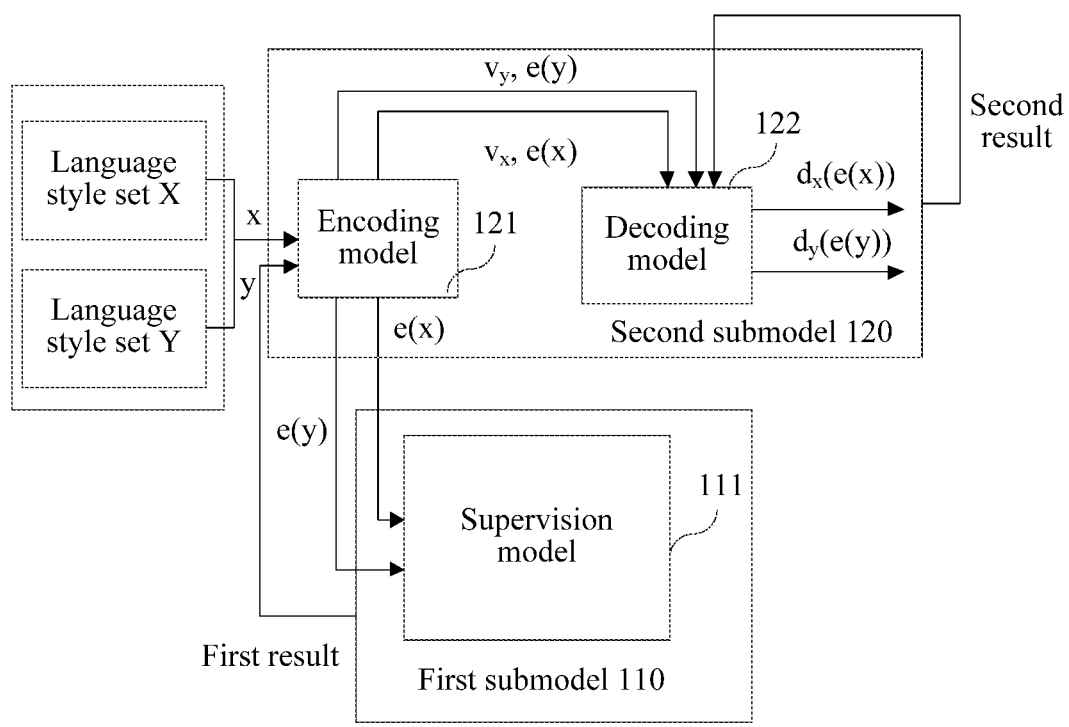
FIG. 1 is a schematic diagram of a training model according to an embodiment of the present disclosure.

To make the objectives, technical solutions, and advantages of the present disclosure clearer, the following further describes implementations of the present disclosure in detail with reference to the accompanying drawings.

First, several terms involved in the present disclosure are introduced.

Language style: a specific expression manner for expressing a natural sentence having a specific meaning. For example, language styles include fresh and elegant, bright and plain, flowery, euphemistic and implicit, oral-dominant, and the like. A natural sentence having a same meaning may have a plurality of specific expression manners, and each specific expression manner corresponds to a language style of one type.

For example, for a natural sentence that expresses a meaning of "semantics x", a natural sentence whose language style is bright and plain is: semantics x expressed by using a language style 1; a natural sentence whose language style is flowery is: semantics x expressed by using a language style 2; a natural sentence whose language style is euphemistic and implicit is: semantics x expressed by using a language style 3; and a natural sentence whose language style is oral-dominant is: semantics x expressed by using a language style 4.

Certainly, the language styles may be categorized in other formats. For example, the language style is divided into poetic, classical, literary, or the like. The dividing manner of the language styles is not limited in this embodiment.

Parallel corpus: including a plurality of groups of sentence pairs, where each group of sentence pairs includes a plurality of sentences. Different sentences in each group of sentence pairs have a same meaning but in different language styles.

Optionally, the parallel corpus may also be referred to as a dialogue corpus, a personalized dialogue corpus, or the like. The specific name of the parallel corpus is not limited in this embodiment.

In the related technology, the intelligent dialogue system searches, in the parallel corpus, for a natural sentence having the target language style according to the target language style, to generate a styled sentence.

For example, the target language style is euphemistic and implicit, and the intelligent dialogue system needs to generate a styled sentence having "semantics x", then the language system finds, in the parallel corpus, a natural sentence 1 that expresses the semantics x by using the style of euphemistic and implicit, and generates the styled sentence according to the natural sentence 1. However, when there is no natural sentence 1 that expresses the semantics x by using the style of euphemistic and implicit in the parallel corpus, the intelligent dialogue system searches for another natural sentence 2 having a language style of euphemistic and implicit, or searches for a natural sentence 3 having a same meaning but another language style, and generates the styled sentence according to the natural sentence 2 and the natural sentence 3. The finally generated styled sentence may depart from the original semantics x, or an actual language style may be inconsistent with the target language style. Namely, a sentence having the target language style cannot be accurately generated.

Based on the foregoing technical problem, the present disclosure provides the following technical solutions. A style vector corresponding to each language style is pre-trained, then style information in a natural sentence in a corpus is filtered, and a content vector and a style vector that are obtained after filtration are encoded to obtain a styled sentence, so that a language system no longer generates a styled sentence depending on existing styled sentences in a parallel corpus, and can add a target language style for all natural sentences, thereby improving the intelligence of the computer device during style conversion.

The content vector is configured to indicate a meaning (or semantics) of the natural sentence. Optionally, the content vector is indicated by an i-dimensional array, and is a positive integer.

The style vector is configured to indicate a language style of a natural sentence. Optionally, the style vector is indicated by a j-dimensional array, and j is a positive integer. Each style vector corresponds to a language style. In this embodiment, the division manner of the language style is not limited, and languages and/or use scenarios may have different language styles.

Optionally, in the present disclosure, descriptions are provided by using an example in which an execution entity of each embodiment is a computer device. The computer device may be implemented as at least one of an intelligent dialogue system, a style conversion system, and a text chatting robot. An actual product form of the computer device is not limited in the present disclosure. The computer device may be mounted in a server, or may be mounted in a terminal, and this is not limited in this embodiment. The computer device may be a mobile phone, a tablet computer, a laptop portable computer, a desktop computer, or the like. In some embodiments, the method for converting a styled sentence in the embodiments of the present disclosure may be implemented as a game assistant in a mobile phone, or an automatic chatting function of different role models in a game program.

The following separately describes the training model (referring to FIG. 1) involved in the present disclosure and the computer device (referring to FIG. 2) in a use process.

FIG. 1 is a schematic diagram of a training model according to an embodiment of the present disclosure. The training model includes a first sub-model 110 and a second sub-model 120.

The first sub-model 110 is obtained by establishment (or training) according to a supervision model 111. The second sub-model 120 is obtained by establishment (or training) according to an encoding model 121 and a decoding model 122.

When the encoding model 121 and the decoding model 122 are trained, natural training sentences (indicated by x and y in FIG. 1) having at least two language styles in the corpus are inputted into the encoding model 121. The encoding model 121 classifies each natural training sentence to obtain a content vector (indicated by e(x) and e(y) in FIG. 1) and a style vector (indicated by $v_x$ and in $v_y$, FIG. 1) that correspond to each natural training sentence.

An output result of the encoding model 121 is used as an input for the supervision model 111. The first sub-model 110 determines, through a supervision capability of the supervision model 111, whether the input at least two content vectors having a same meaning are similar.

The supervision capability refers to a capability of determining a language style corresponding to a received content vector. The at least two content vectors inputted into the supervision model 111 are generated according to natural training sentences that have a same meaning and that have different language styles. Therefore, when the supervision model 111 can determine the corresponding language style according to the input content vector, it indicates that the content vector still has style information, and a similarity between content vectors having different language styles is relatively low. Therefore, supervision results outputted by the supervision model 111 greatly differ. In this case, the first sub-model 110 can determine, according to the difference between supervision results outputted by the supervision model 111, whether at least two convent vectors having a same meaning are similar.

The first sub-model 110 feeds back a determining result (a first result) to the encoding model 121 in the second sub-model 120. The encoding model 121 adjusts a model parameter of the encoding model 121 according to the determining result, to improve a classification capability of the encoding model 121. The classification capability refers to a capability of classifying an input natural training sentence into a corresponding content vector and style vector.

The encoding model 121 further inputs the content vector and the style vector that are obtained by classification into the decoding model 122. The decoding model 122 is used to restore into a natural training sentence having a language style according to the content vector and the style vector. For example, in FIG. 1, the decoding model 121 restores into a natural training sentence $d_x(e(x))$ according to the content vector e(x) and the style vector $v_x$. The decoding model 121 restores into a natural training sentence $d_y(e(y))$ according to the content vector e(y) and the style vector $v_y$.

The second sub-model 120 determines, according to a probability whether the output result of the decoding model 121 is the same as the natural training sentence inputted into the encoding model 121, a restoration capability of the decoding model 121. The decoding model 122 adjusts a model parameter of the decoding model 122 according to an output result (a second result) of the second sub-model 120, to improve a restoration capability of the decoding model 122. The restoration capability refers to a capability of restoring into a natural training sentence according to the content vector and the style vector.

For example, the second sub-model 120 determines the restoration capability of the decoding model 121 according to a probability that $d_x(e(x))$ is the same as the natural training sentence x and a probability that $d_y(e(y))$ is the same as the natural training sentence y.

Illustratively, the first sub-model 110 is expressed by using the following formula:

$$L_{critic}(X, Y) = -\frac{1}{|X|}\sum_{x \in X} f(e(x)) + \frac{1}{|Y|}\sum_{y \in Y} f(e(y))$$

$L_{critic}(X, Y)$ refers to an output result of the first sub-model, namely, a similarity between two input content vectors; X is a set formed by natural training sentences having a first language style in the corpus; |X| is the number of natural training sentences having the first language style; Y is a set formed by natural training sentences having a second language style; |Y| is the number of sets formed by natural training sentences having the second language style; the first language style is different from the second language style; e(x) is a content vector that is outputted by the encoding model 121 and that is of a natural training sentence having the first language style; e(y) is a content vector that is outputted by the decoding model 122 and that is of a natural training sentence having the second language style; f(e(x)) is a supervision result outputted by the supervision model 111 when an input is e(x); and f(e(y)) is a supervision result outputted by the supervision model 111 when the input is e(y).

Illustratively, the second sub-model 120 is expressed by using the following formula:

$$L_{cycle}(X, Y) = -\frac{1}{|X|}\sum_{x \in X} \log p(d_x(e(x)) = x) - \frac{1}{|Y|}\sum_{y \in Y} \log p(d_y(e(y)) = y)$$

$L_{cycle}(X, Y)$ refers to an output result of the second sub-model, namely, a probability that two input natural training sentences are restored; $d_x(e(x))$ is a decoding result outputted when an input of the decoding model 122 is e(x) and a style vector $v_x$; $d_y(e(y))$ is a decoding result outputted when the input of the decoding model 122 is e(y) and a style vector $v_y$; $p(d_x(e(x))=x)$ is a probability that $d_x(e(x))$ is the same as a natural training sentence x; and $p(d_y(e(y))=y)$ is a probability that $d_y(e(y))$ is the same as a natural training sentence y.

Illustratively, the training model is expressed by using the following formula:

$$L_{transfer}(X,Y)=L_{cycle}(X,Y)-\lambda L_{critic}(X,Y)$$

$L_{transfer}(X, Y)$ refers to a training result outputted by the training model. The training result is used to reflect a classification capability of the encoding model 121 and a restoration capability of the decoding model 122. A value of $L_{transfer}(X, Y)$ is in a native correlation with the classification capability of the encoding model 121. Namely, a smaller value of $L_{transfer}(X, Y)$ indicates a better classification capability of the encoding model 121. A value of $L_{transfer}(X, Y)$ is in a negative correlation with the restoration capability of the decoding model 122. Namely, a smaller value of $L_{transfer}(X, Y)$ indicates a better restoration capability of the encoding model 121. $\lambda$ is a balance factor, and is a positive number less than 1, for example, $\lambda=0.9$. Optionally, a value of $\lambda$ is fixed, or the value of $\lambda$ is adjusted according to the value of $L_{cycle}(X, Y)$ and/or $L_{critic}(X, Y)$.

It is to be noted that the foregoing formulas are merely Illustrating, and the formulas may be adaptively changed in actual implementation. For example, when three natural sentences are inputted into the encoding model 121, an output result corresponding to a third natural sentence should be added to each formula.

After training by the training model, an encoding model having a relatively high classification capability can be obtained, which is referred to as a first encoding model below. Correspondingly, an encoding model trained before the first encoding model is obtained is referred to as a second encoding model, and a decoding model having a relatively high restoration capability is referred to as a first decoding model below. Correspondingly, a decoding model trained before the first decoding model is obtained is referred to as a second decoding model.

In this embodiment, in a process of obtaining the first encoding model by training, a style vector outputted by the encoding model (namely, the first encoding model) during training for the last time is stored as a style vector used to add a language style for a natural sentence in a use process.

Figure 2:
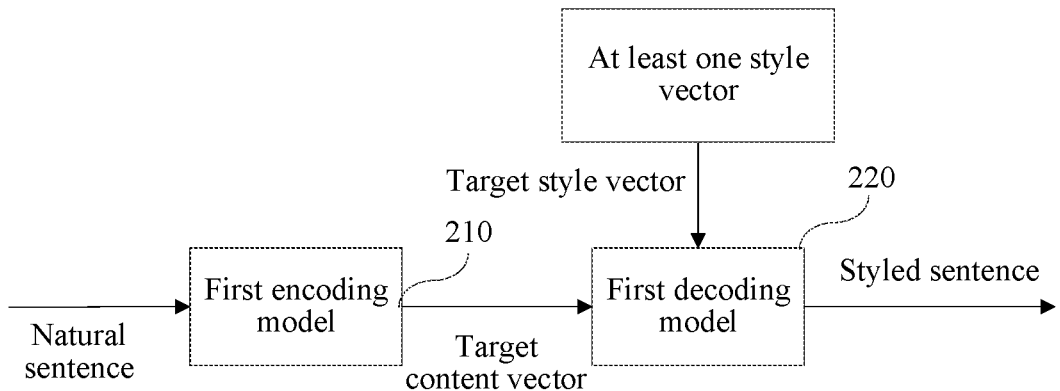
FIG. 2 is a schematic diagram of a computer device according to an embodiment of the present disclosure.

FIG. 2 is a schematic diagram of a computer device according to an embodiment of the present disclosure. The computer device may be an intelligent dialogue system. The computer device includes a first encoding model 210 and a first decoding model 220.

The first encoding model 210 is obtained by training the second encoding model according to the training model shown in FIG. 1. The first encoding model 210 is used to classify an input natural sentence, to obtain a target content vector corresponding to the natural sentence. The first encoding model 210 can filter style information in the input natural sentence, to obtain a target content vector that includes least style information. The style information is used to indicate a language style of a natural sentence.

The first encoding model 210 transfers an output target content vector to the first decoding model 220.

The first decoding model 220 is obtained by training the second decoding model according to the training model shown in FIG. 1. The first decoding model 220 determines, from at least one style vector stored in the computer device, a target style vector corresponding to the to-be-converted language style, and generates a styled sentence corresponding to the natural sentence according to the target style vector and the target content vector that is transferred by the first encoding model 210.

Figure 3:
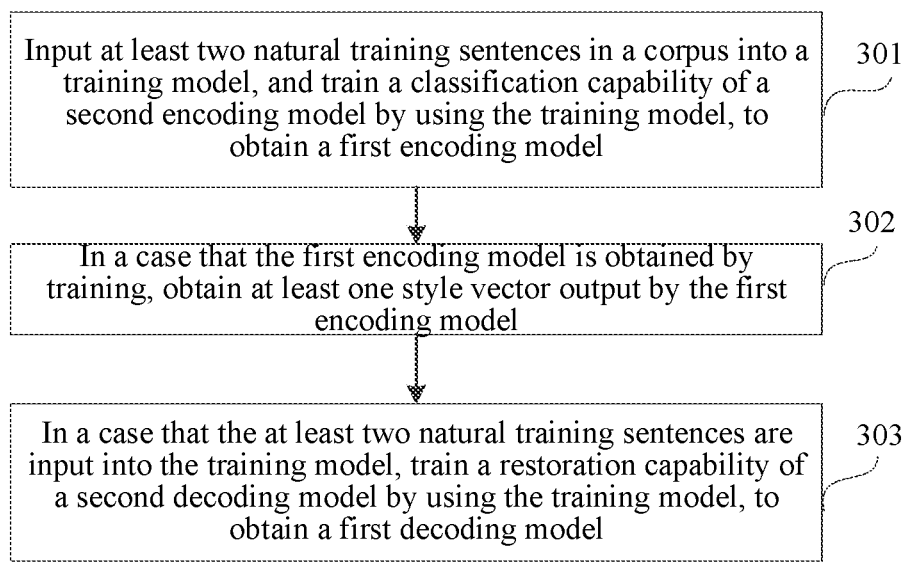
FIG. 3 is a flowchart of a model training method according to another embodiment of the present disclosure.

FIG. 3 is a flowchart of a method for training a model according to another embodiment of the present disclosure. The method for training a model is used in the training model shown in FIG. 1. The method for training a model may be executed by a computer device. The method includes the followings.

Step 301: Input at least two natural training sentences in a corpus into a training model, and train a classification capability of a second encoding model by using the training model, to obtain a first encoding model.

Each of the at least two natural training sentences corresponds to a language style. There is at least one each natural training sentence. In most cases, a larger number of natural training sentences of a same language style indicates a stronger classification capability of a trained first encoding model.

Illustratively, natural training sentences inputted into the training model include: natural sentences whose language styles are euphemistic and implicit and oral-dominant. The number of natural sentences whose language style is euphemistic and implicit is five, and the number of natural sentences whose language style is oral-dominant is also five.

The classification capability refers to a capability of classifying an input natural training sentence into a corresponding content vector and style vector. The content vector is configured to indicate a meaning of the natural training sentence, and the style vector is configured to indicate a language style of the natural training sentence. When the classification capability of the first encoding model is relatively strong, the style information carried in the content vector is as little as possible.

Step 302: In a case that the first encoding model is obtained by training, obtain at least one style vector outputted by the first encoding model.

Each style vector is obtained by classifying a natural training sentence of a corresponding language style by the first encoding model. In other words, an ith style vector is obtained by classifying a natural training sentence of an ith language style by the first encoding model.

Step 303: In a case that the at least two natural training sentences are inputted into the training model, train a restoration capability of a second decoding model by using the training model, to obtain a first decoding model.

The restoration capability refers to a capability of restoring into a natural training sentence according to the content vector and the style vector.

Optionally, in one embodiment, the encoding model and the decoding model are trained simultaneously by using the training model. Namely, this step and step 301 may be executed simultaneously.

Optionally, the training model includes a first sub-model and a second sub-model; the first sub-model is established according to a preset supervision model; the first sub-model is configured to output a similarity between different content vectors according to a supervision capability of the supervision model; the supervision capability refers to a capability of determining a language style corresponding to a received content vector; the second sub-model is established according to the second encoding model and the second decoding model; and the second sub-model is configured to output, according to the second decoding model and a second encoding function, a probability that the natural sentence is restored.

Thus, according to the method for training a model provided in the present disclosure, the classification capability of the encoding model is trained to obtain the first encoding model, and the restoration capability of the decoding model is trained to obtain the first decoding model, so that the computer device can classify the natural sentence by using the first encoding model in use, to obtain the content vector having least style information, and then the content vector and the target style vector that is obtained in a training process are encoded by using the first decoding model to obtain the styled sentence, to resolve the problem that the computer device may not generate a styled sentence that has a target language style and that meets expectation of the user caused by that the natural sentence having the target language style can only be searched in a parallel corpus. The computer device stores a style vector corresponding to each language style, the first decoding model can determine, from a plurality of stored style vectors, the target style vector corresponding to the target language style, and generate the styled sentence according to the target style vector and the content vector. Therefore, it is ensured that each natural sentence can be converted into a styled sentence having a target language style, thereby improving the intelligence of the computer device during style conversion.

Training processes of the first encoding model and the second encoding model are described in detail below.

In some embodiments, training processes of the first encoding model and the second encoding model include the followings.

1. Input m groups of first natural training sentences and second natural training sentences into the first sub-model to train the supervision capability of the supervision model.

Each group of the first natural training sentence and the second natural training sentence is natural training sentences having different language styles and having a same meaning.

For example, the m groups of natural training sentences inputted into the first sub-model include the following group of natural training sentences: a natural training sentence 1 "read", a natural training sentence 2 "reviewed", a natural training sentence 3 "gone over", and a natural training sentence 4 "have been read".

Apparently, the group of natural training sentences has a same meaning, but has different language styles.

Optionally, the m groups of first natural training sentences and second natural training sentences are respectively derived from languages sets of corresponding language styles in the corpus. Namely, the first natural training sentence is derived from a language style set corresponding to the first natural training sentence, and the second natural training sentence is derived from a language style set corresponding to the second natural training sentence. The language style set corresponding to the first natural training sentence is different from the language style set corresponding to the second natural training sentence.

For example, in the foregoing example, the natural training sentence 1 "read" is derived from a bright and plain set, the natural training sentence 2 "reviewed" is derived from a flowery set, the natural training sentence 3 "gone over" is derived from an euphemistic and implicit set, and the natural training sentence 4 "have been read" is derived from an oral-dominant set.

It is to be noted that at least two natural training sentences are inputted into the first sub-model, and in one embodiment, descriptions are provided only by using an example in which the natural training sentences are the first natural training sentence and the second natural training sentence. In actual implementation, if at least three natural training sentences are inputted into the first sub-model, in two different natural training sentences, one is the first natural training sentence, and the other is the second natural training sentence.

For example, the natural training sentences inputted into the first sub-model include three different x, y, and z. For x and y, when x is the first natural training sentence, y is the second natural training sentence, or when y is the first natural training sentence, x is the second natural training sentence. For y and z, when y is the first natural training sentence, z is the second natural training sentence; or, when z is the first natural training sentence, y is the second natural training sentence. For x and z, when x is the first natural training sentence, z is the second natural training sentence; or, when z is the first natural training sentence, x is the second natural training sentence. Further, m is a positive integer. Optionally, a value of m is fixed. For example, m is 20.

2. Stop training in a case that a number of training times reaches a preset number of times, to obtain a trained supervision model.

Optionally, the number of training times is set by a developer or a user. In one embodiment, a value of the preset number of times is not limited. For example, the number of training times is 10, 11, 1000, 10000, or the like.

Optionally, when the supervision model is trained, the supervision model adjusts a model parameter of the supervision model according to a training result of this time, to improve a supervision capability of the supervision model. Optionally, the supervision model adjusts the model parameter of the supervision model according to an error back propagation algorithm according to a training result of this time.

Optionally, when the supervision model is trained, m groups of first natural training sentences and second natural training sentences input during training of the current time are all different from m groups of first natural training sentences and second natural training sentences input during training for the previous times.

In one embodiment, the supervision model is trained, to improve the supervision capability of the supervision model, and improve the accuracy of determining a similarity between different content vectors by the first training model, thereby improving the accuracy of determining the classification capability of the second encoding model and the restoration capability of the second decoding model by the training model.

3. Update the first sub-model in the training model by using the trained supervision model.

The first sub-model in the training model is obtained according to the trained supervision model.

4. Input n groups of third natural training sentences and fourth natural training sentences into the training model, to train the second encoding model and the second decoding model and obtain a model training result.

Each group of the third natural training sentence and the fourth natural training sentence are natural training sentences having different language styles and having a same meaning.

Related descriptions of the third natural training sentence are similar to related descriptions of the first natural training sentence, and related descriptions of the fourth natural training sentence are similar to related descriptions of the second natural training sentence. See Step 1 for details, and details are not described in one embodiment.

The model training result includes: a first result outputted by an updated first sub-model and a second result outputted by the second sub-model.

The first result is used to indicate a similarity between at least two content vectors having a same meaning. A value of the first result is in a negative correlation with a classification capability of the second encoding model. Namely, a larger value of the first result indicates a lower similarity between at least two content vectors having a same meaning, and a weaker classification capability of the second encoding model. A smaller value of the first result indicates a higher similarity between at least two content vectors having a same meaning, and a stronger classification capability of the second encoding model.

The second result is used to indicate a probability that the output result of the second decoding model is the same as the natural sentence inputted into the second encoding model. A value of the second result is in a positive correlation with a restoration capability of the second decoding model. That is, a larger value of the second result indicates a higher probability that the output result of the second decoding model is the same as the natural sentence inputted into the second decoding model, and a stronger restoration capability of the second decoding model. A smaller value of the second result indicates a lower probability that the output result of the second decoding model is the same as the natural sentence inputted into the second encoding model, and a weaker classification capability of the second decoding model.

The n is a positive integer. Optionally, a value of n is fixed. For example, n is 20. Optionally, values of n and m may be the same or different.

Figure 4:
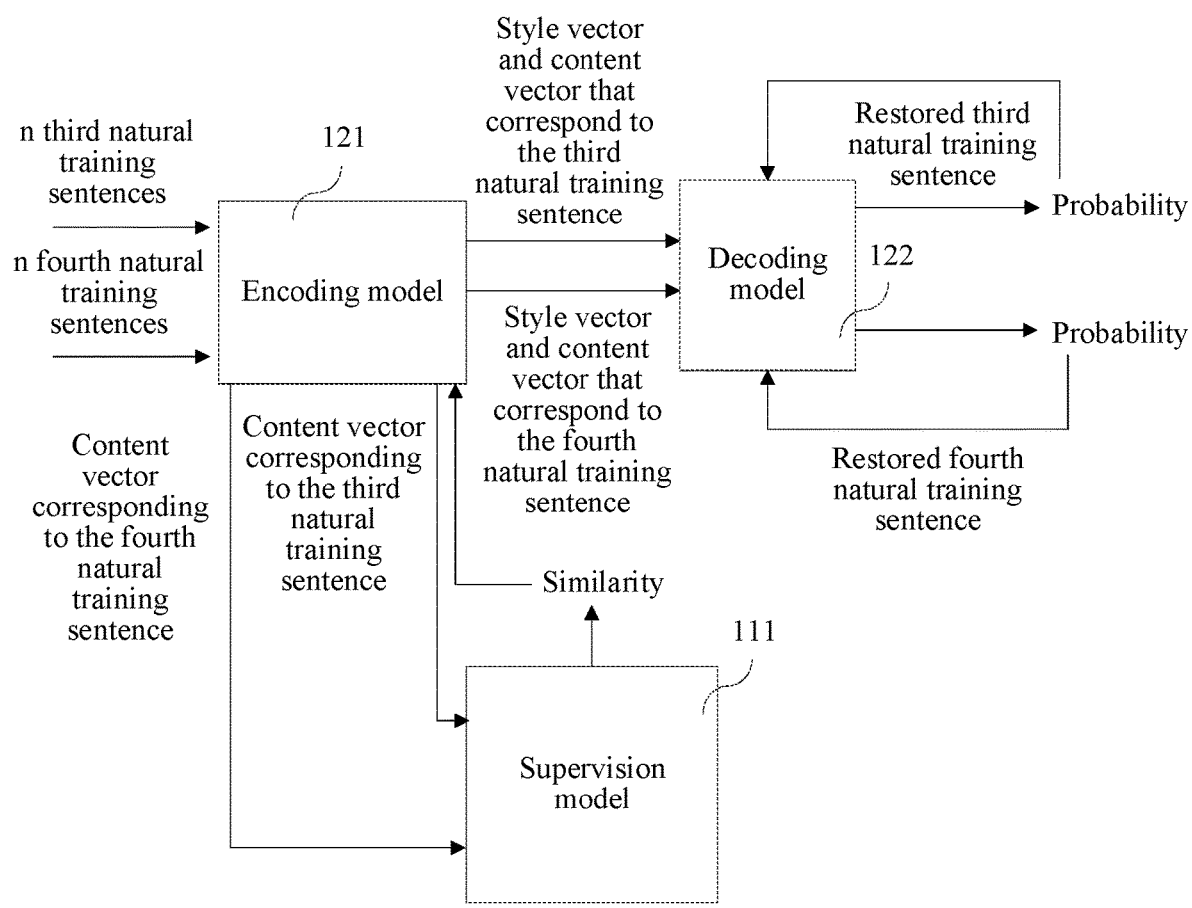
FIG. 4 is a schematic diagram of another model training method according to another embodiment of the present disclosure.

Optionally, referring to FIG. 4, Step 4 may include the followings.

41: Input the n groups of third natural training sentences and fourth natural training sentences into the second encoding model for classification, to obtain a style vector and a content vector that correspond to each group of the third natural training sentence and a style vector and a content vector that correspond to each group of the fourth natural training sentence.

A stronger classification capability of the second encoding model indicates less style information included in the content vector obtained by classification.

42: Input a content vector corresponding to a same group of the third natural training sentence and a content vector corresponding to the fourth natural training sentence into the trained supervision model to determine a similarity, to obtain the similarity between the content vector corresponding to the third natural training sentence and the content vector corresponding to the fourth natural training sentence.

The similarity between the content vector corresponding to the third natural training sentence and the content vector corresponding to the fourth natural training sentence is the first result obtained by the first sub-model.

Optionally, in one embodiment, the similarity is indicated by a difference between a supervision result of the content vector corresponding to the third natural training sentence and a supervision result of the content vector corresponding to the fourth natural training sentence.

43: Input the content vector and a style vector that correspond to the same group of the third natural training sentence and the content vector and a style vector that correspond to the fourth natural training sentence into the second decoding model for restoration, to obtain a restored third natural training sentence and a restored fourth natural training sentence.

44: In a case that the similarity between the content vector corresponding to the third natural training sentence and the content vector corresponding to the fourth natural training sentence, a probability that the restored third natural training sentence is the same as the third natural training sentence, and a probability that the restored fourth natural training sentence is the same as the fourth natural training sentence keep unchanged (or a change range is less than a preset condition) within the preset number of training times, determine that a function converges, and stop training, to obtain the first encoding model and the first decoding model.

The probability that the restored third natural training sentence is the same as the third natural training sentence and the probability that the restored fourth natural training sentence is the same as the fourth natural training sentence are the second result outputted by the second sub-model.

The preset number of training times is at least two. The preset number of training times/iterations may be 3, 5, 100, 1000, 10000, or the like. In one embodiment, the value of the preset number of training times is not limited.

Optionally, when the similarity between the content vector corresponding to the third natural training sentence and the content vector corresponding to the fourth natural training sentence changes within the preset number of training times, and/or the probability that the restored third natural training sentence is the same as the third natural training sentence changes within the preset number of training times, and/or the probability that the restored fourth natural training sentence is the same as the fourth natural training sentence changes within the preset number of training times, the model parameter in the second encoding model is adjusted according to the first result, to obtain the trained second encoding model, and the model parameter in the second decoding model is adjusted according to the second result, to obtain the trained second decoding model.

Optionally, when the first encoding model and the first decoding model are obtained by training for the last time, at least one style vector outputted by the first encoding model in a last training process is stored. The at least one style vector is configured to convert a language style of the input natural sentence when a language processing system is used to generate a style.

5. Stop training in response to determining, according to the model training result, that the function model converges, to obtain the first encoding model and the first decoding model.

6. Execute Step 1 again, that is, repeating the execution of inputting m groups of first natural training sentences and second natural training sentences into the first sub-model to train the supervision capability of the supervision model in response to determining, according to the model training result, that the function model does not converge.

Thus, in one embodiment, the supervision model is trained, to improve the supervision capability of the supervision model, and improve the accuracy of determining a similarity between different content vectors by the first training model, thereby improving the accuracy of determining the classification capability of the second encoding model and the restoration capability of the second decoding model by the training model.

Optionally, the language processing system may not train the supervision model, i.e., skip executing steps 1-3, and this is not limited in one embodiment.

Optionally, before Step 1, the computer device further pre-trains the supervision model, the second encoding model, and the second decoding model.

Pre-training the supervision model includes: inputting at least two content vectors whose similarity is greater than a preset threshold into a first sub-model; when the first result outputted by the first sub-model is different from the first result of pre-training for previous p times, adjusting the model parameter in the supervision model; and when the first result outputted by the first sub-model is the same as the first result of the pre-training for previous p times, obtaining a pre-trained supervision model. In this case, the language processing system executes steps 1-6 according to the pre-trained supervision model.

Pre-training the second encoding model and the second decoding model includes: inputting at least one pre-training sentence into the second sub-model; when the second result outputted by the second sub-model is different from the second result of pre-training for previous q times, adjusting a model parameter in the second encoding model and/or the second decoding model; and when the second result outputted by the second sub-model is the same as the second result of the pre-training for previous q times, obtaining a pre-trained second encoding model and a pre-trained second decoding model. In this case, the language processing system executes steps 1-6 according to the pre-trained second encoding model and the pre-trained second decoding model.

Thus, in one embodiment, rough model parameters in the supervision model, the second encoding model, and the second decoding model can be obtained by pre-training the supervision model, the second encoding model, and the second decoding model, to avoid a problem that excessive resources are consumed caused by an excessively large number of training times due to training of the second encoding model and the second decoding model directly according to the training model, thereby improving the efficiency of training the second encoding model and the second decoding model.

Figure 5:
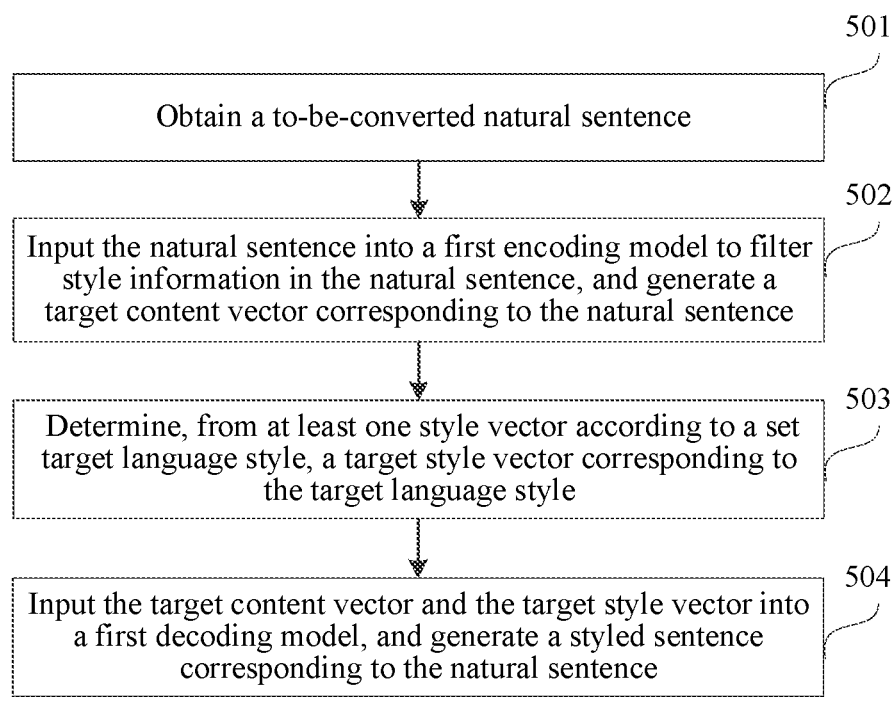
FIG. 5 is a flowchart of a method for generating a styled sentence according to an embodiment of the present disclosure.

FIG. 5 is a flowchart of a method for generating a styled sentence according to an embodiment of the present disclosure. The method for generating a styled sentence is applied to the computer device shown in FIG. 2. The method includes the followings.

Step 501: Obtain a to-be-converted natural sentence.

Optionally, the to-be-converted natural sentence is selected by the language processing system from the corpus, or is inputted by a user.

Step 502: Input the natural sentence into a first encoding model to filter style information in the natural sentence, and generate a target content vector corresponding to the natural sentence.

The first encoding model is obtained by training the second encoding model by using the training model. The training model is configured to train the classification capability of the second encoding model to obtain the first encoding model. The classification capability refers to a capability of classifying the input natural sentence into a corresponding content vector and style vector.

The target content vector is configured to indicate a meaning of the natural sentence. The style information is used to indicate a language style of the natural sentence.

Step 503: Determine, from at least one style vector according to a set target language style, a target style vector corresponding to the target language style. Optionally, the computer device provides at least one language style. The computer device sets a target language style according to a received setting operation. Optionally, the setting operation is executed by the user.

Each of the at least one style vector corresponds to a language style. In this case, at least one language style provided by the computer device has a corresponding style vector.

The at least one style vector is obtained by classifying an input natural training sentence having a language style by the first encoding model in a case that the first encoding model is obtained by training, and each natural training sentence having a language style corresponds to a style vector in the at least one style vector.

Step 504: Input the target content vector and the target style vector into a first decoding model, and generate a styled sentence corresponding to the natural sentence.

The first decoding model is obtained by training the second decoding model by using the training model. The training model is further used to train the restoration capability of the second decoding model to obtain the first decoding model. The restoration capability refers to a capability of restoring into the natural sentence according to the content vector and the style vector.

Thus, according to the method for generating a styled sentence provided in one embodiment, the natural sentence is classified by using the first encoding model, to obtain the content vector having least style information, and then the content vector and the target style vector that is obtained in a training process are encoded by using the first decoding model to obtain the styled sentence, to resolve the problem that the computer device may not generate a styled sentence that has a target language style and that meets expectation of the user caused by that the natural sentence having the target language style can only be searched in a parallel corpus. The computer device stores a style vector corresponding to each language style, the first decoding model can determine, from a plurality of stored style vectors, the target style vector corresponding to the target language style, and generate the styled sentence according to the target style vector and the content vector. Therefore, it is ensured that each natural sentence can be converted into a styled sentence having a target language style, thereby improving the intelligence of the computer device.

Optionally, the computer device further provides a combination of language styles formed by at least one language style, for example, a combination of language styles of fresh and elegant, and bright and plain. If the set target language style in the computer device is a combination of language styles, the computer device can further generate a style language after fusion of language styles.

Figure 6:
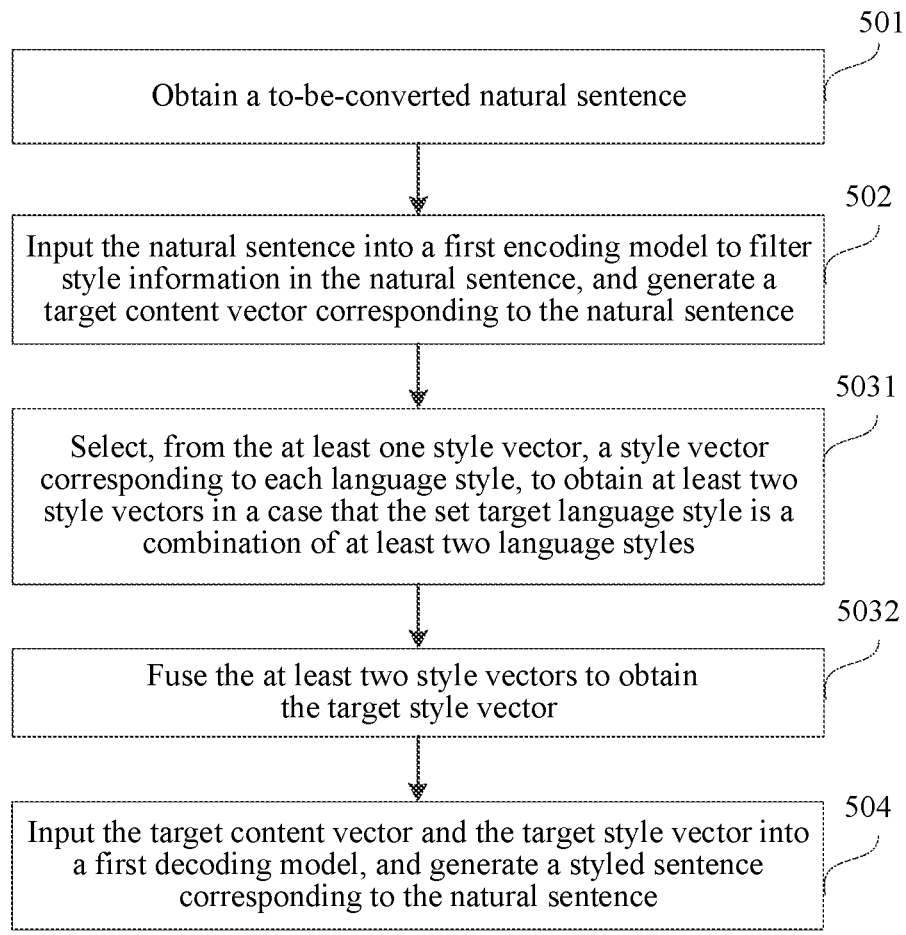
FIG. 6 is a flowchart of another method for generating a styled sentence according to another embodiment of the present disclosure.

Referring to FIG. 5, in this case, referring to FIG. 6, step 503 is replaced with the following steps:

Step 5031: Select, from the at least one style vector, a style vector corresponding to each language style, to obtain at least two style vectors in a case that the set target language style is a combination of at least two language styles.

For example, the target language style is a combination of language styles of fresh and elegant, and bright and plain, the language processing system determines, from at least one style vector, a style vector corresponding to fresh and elegant and a style vector corresponding to bright and plain.

Step 5032: Fuse the at least two style vectors to obtain the target style vector.

Fusing, by the computer device, the at least two style vectors to obtain the target style vector includes: determining an average value of the at least two style vectors, and determining the average value as the target style vector.

For example, the computer device calculates an average value of the style vector corresponding to fresh and elegant and the style vector corresponding to bright and plain, and determines the average value as the target style vector.

In one embodiment, different style vectors are fused to obtain the target style vector, to expand the language style provided by the language processing system.

Optionally, in the foregoing embodiments, the natural sentence, the natural training sentence, and the pre-training sentence are all sentences in a corpus of a language processing system. In a use process of the language processing system, the sentences are referred to as natural sentences. In a training process of the language processing system, the sentences are referred to as natural training sentences. In a pre-training process of the language processing system, the sentences are referred to as pre-training sentences.

Optionally, in the foregoing embodiments, the encoding model is established based on a long short term memory (LSTM) neural network, or the encoding model is established based on a gated recurrent unit (GRU) neural network. The type of the encoding model is not limited in one embodiment. The encoding model includes a first encoding model and a second encoding model.

Optionally, in the foregoing embodiments, the decoding model is established based on an LSTM neural network, or the decoding model is established based on a GRU neural network. The type of the decoding model is not limited in one embodiment. The decoding model includes a first decoding model and a second decoding model.

Optionally, in the foregoing embodiments, the supervision model is established based on an LSTM neural network, or the supervision model is established based on a GRU neural network. The type of the supervision model is not limited in one embodiment.

Figure 7:
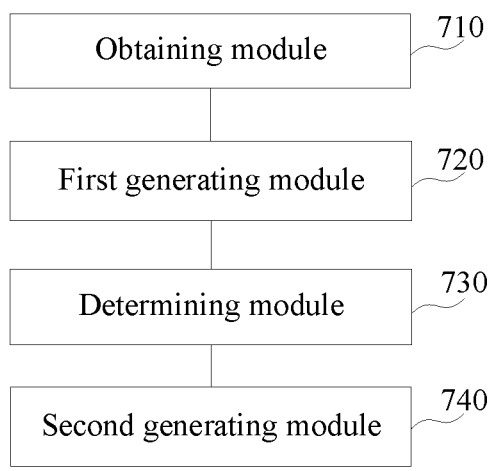
FIG. 7 is a block diagram of an apparatus for generating a styled sentence according to an embodiment of the present disclosure.

FIG. 7 is a block diagram of an apparatus for generating a styled sentence according to an embodiment of the present disclosure. The apparatus may be implemented as the entire or a part of a computer device by means of software, hardware, or a combination thereof. The apparatus includes an obtaining module 710, a first generation module 720, a determining module 730, and a second generation module 740.

The obtaining module 710 is configured to obtain a to-be-converted natural sentence.

The first generation module 720 is configured to: input the natural sentence into a first encoding model to filter style information in the natural sentence, and generate a target content vector corresponding to the natural sentence, the target content vector being configured to indicate a meaning of the natural sentence, and the style information being configured to indicate a language style of the natural sentence.

The determining module 730 is configured to determine, from at least one style vector according to a set target language style, a target style vector corresponding to the target language style, each of the at least one style vector corresponding to a language style.

The second generation module 740 is configured to: input the target content vector and the target style vector into a first decoding model, and generate a styled sentence corresponding to the natural sentence.

Optionally, the at least one style vector is obtained by classifying an input natural training sentence having a language style by the first encoding model in a case that the first encoding model is obtained by training, and each natural training sentence having a language style corresponds to a style vector in the at least one style vector; and the determining module 730 includes a selection unit and a fusion unit.

The selection unit is configured to select, from the at least one style vector, a style vector corresponding to each language style, to obtain at least two style vectors in a case that the set target language style is a combination of at least two language styles; and the fusion unit is configured to fuse the at least two style vectors to obtain the target style vector.

Optionally, the fusion unit is further configured to: determine an average value of the at least two style vectors, and determine the average value as the target style vector.

Optionally, the first encoding model is obtained by training a second encoding model by a training model, where the training model is configured to train a classification capability of the second encoding model, to obtain the first encoding model; the first decoding model is obtained by training a second decoding model by the training model, where the training model is further configured to train a restoration capability of the second decoding model, to obtain the first decoding model; and the classification capability refers to a capability of classifying an input natural sentence into a corresponding content vector and style vector, and the restoration capability refers to a capability of restoring into the natural sentence according to the content vector and the style vector.

Figure 8:
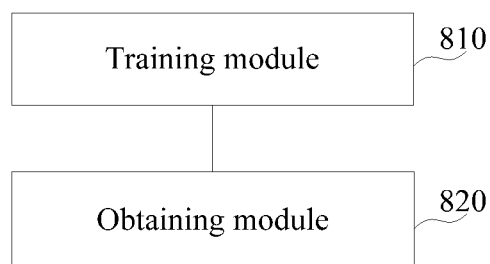
FIG. 8 is a block diagram of a model training apparatus according to an embodiment of the present disclosure.

FIG. 8 is a block diagram of an apparatus for training a model according to an embodiment of the present disclosure. The apparatus may be implemented as the entire or a part of a computer device by means of software, hardware, or a combination thereof. The model includes a first encoding model and a first decoding model. The apparatus includes a training module 810 and an obtaining module 820.

The training module 810 is configured to: input at least two natural training sentences in a corpus into a training model, and train a classification capability of a second encoding model by using the training model to obtain the first encoding model, each natural training sentence corresponding to a language style, and the classification capability referring to a capability of classifying the input natural training sentence into a corresponding content vector and style vector.

The obtaining module 820 is configured to obtain at least one style vector outputted by the first encoding model in a case that the first encoding model is obtained by training, each style vector being obtained by classifying the natural training sentence of a corresponding language style by the first encoding model.

The training module 810 is further configured to train a restoration capability of a second decoding model by the training model to obtain the first decoding model in a case that the at least two natural training sentences are inputted into the training model, the restoration capability referring to a capability of restoring into the natural training sentence according to the content vector and the style vector. The content vector indicates a meaning of the natural training sentence, and the style vector indicates a language style of the natural training sentence.

Optionally, the training model includes a first sub-model and a second sub-model; the first sub-model is established according to a preset supervision model; the first sub-model is configured to output a similarity between different content vectors according to a supervision capability of the supervision model; the supervision capability refers to a capability of determining a language style corresponding to a received content vector; the second sub-model is established according to the second encoding model and the second decoding model; and the second sub-model is configured to output, according to the second decoding model and a second encoding function, a probability that the natural sentence is restored.

Optionally, the training module 810 includes a supervision training unit, a first generating unit, a model updating unit, a model training unit, and a second generating unit.

The supervision training unit is configured to input m groups of first natural training sentences and second natural training sentences into the first sub-model to train the supervision capability of the supervision model, each group of the first natural training sentence and the second natural training sentence being natural training sentences having different language styles and having a same meaning, and m being a positive integer.

The first generating unit is configured to stop training in a case that a number of training times reaches a preset number of times, to obtain a trained supervision model.

The model updating unit is configured to update the first sub-model in the training model by using the trained supervision model.

The model training unit is configured to input n groups of third natural training sentences and fourth natural training sentences into the training model, to train the second encoding model and the second decoding model and obtain a model training result, each group of the third natural training sentence and the fourth natural training sentence being natural training sentences having different language styles and having a same meaning, the model training result comprising a first result outputted by an updated first sub-model and a second result outputted by the second sub-model, and n being a positive integer.

The second generating unit is configured to stop training when determining, according to the model training result, that a function model converges, to obtain the first encoding model and the first decoding model, the function model comprising a trained second encoding model and a trained second decoding model.

Optionally, the model training unit is further configured to input the n groups of third natural training sentences and fourth natural training sentences into the second encoding model for classification, to obtain a style vector and a content vector that correspond to each group of the third natural training sentence and a style vector and a content vector that correspond to each group of the fourth natural training sentence.

The model training unit is further configured to input a content vector corresponding to a same group of the third natural training sentence and a content vector corresponding to the fourth natural training sentence into the trained supervision model to determine a similarity, to obtain the similarity between the content vector corresponding to the third natural training sentence and the content vector corresponding to the fourth natural training sentence.

The model training unit is further configured to input the content vector and a style vector that correspond to the same group of the third natural training sentence and the content vector and a style vector that correspond to the fourth natural training sentence into the second decoding model for restoration, to obtain a restored third natural training sentence and a restored fourth natural training sentence.

The model training unit is further configured to, in a case that the similarity between the content vector corresponding to the third natural training sentence and the content vector corresponding to the fourth natural training sentence, a probability that the restored third natural training sentence is the same as the third natural training sentence, and a probability that the restored fourth natural training sentence is the same as the fourth natural training sentence keep unchanged within the preset number of training times, stop training when determining that the function model converges, to obtain the first encoding model and the first decoding model.

Optionally, the supervision training unit is further configured to continue to execute the operation of inputting m groups of first natural training sentences and second natural training sentences into the first sub-model to train the supervision capability of the supervision model in response to determining, according to the model training result, that the function model does not converge.

Optionally, an embodiment of the present disclosure further provides a computer readable storage medium, the computer readable storage medium storing at least one instruction, at least one program, a code set, or an instruction set, and the at least one instruction, the at least one program, the code set, or the instruction set being loaded and executed by the processor to implement the method for generating a styled sentence in the foregoing method embodiments, or implement the method for training a model in the foregoing method embodiments.

Figure 9:
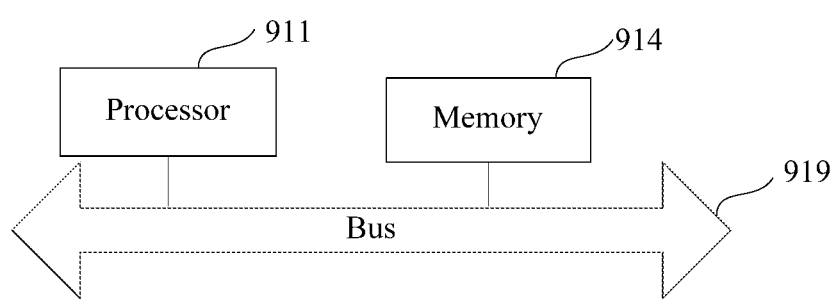
FIG. 9 is a schematic structural diagram of a computer device according to an embodiment of the present disclosure.

FIG. 9 is a Illustrating structural diagram of a computer device involved in an embodiment of the present disclosure. The training model shown in FIG. 1 and/or the first encoding model and the first decoding model that are shown in FIG. 2 are mounted in the computer device. The computer device includes a processor 911, a memory 914, and a bus 919.

The processor 911 includes one or more processing cores. The memory 914 is connected to the processor 911 via the bus 919. The memory 914 is configured to store a program instruction. When the processor 911 executes the program instruction in the memory 914, the method for generating a styled sentence or the method for training a model provided in the foregoing method embodiments is implemented.

Optionally, the memory 914 may be implemented by any type of a volatile or nonvolatile storage device or a combination thereof, such as a static random access memory (SRAM), an electrically-erasable programmable read-only memory (EEPROM), an erasable programmable read-only memory (EPROM), a programmable read-only memory (PROM), a read-only memory (ROM), a magnetic memory, a flash memory, a magnetic disk, or an optical disc.

The foregoing structural example is merely a schematic description for the computer device. The computer device may include more or fewer components. For example, the computer device may not include a sender, or the computer device further includes other components such as a sensor, a display screen, and a power supply. Details are not described again herein.

By using the disclosed methods, devices, and systems, the content vector having least style information can be obtained by classifying the natural sentence by using the first encoding model, and then the first decoding model encodes the content vector and the target style vector that is obtained in the training process to obtain the styled sentence, so that the convent vector is separated from the style vector. In this way, the problem that the computer device may not generate a styled sentence that has a target language style and that meets expectation of the user when a natural sentence of the language style selected by the user does not exist in the parallel corpus can be resolved. The computer device stores a style vector corresponding to each language style, the first decoding model can determine, from a plurality of stored style vectors, the target style vector corresponding to the target language style, and generate the styled sentence according to the target style vector and the content vector. Therefore, it is ensured that each natural sentence can be converted into a styled sentence having a target language style, thereby improving the intelligence of the computer device during style conversion.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for generating a styled sentence by a computer device, comprising:
   obtaining a to-be-converted natural sentence;
   inputting the natural sentence into a first encoding model having a classification capability of classifying the natural sentence into a target content vector and a style vector of the natural sentence, the target content vector indicating a meaning of the natural sentence, and the style vector of the natural sentence indicating a language style of the natural sentence;
   according to an output of the first encoding model, removing the style vector of the natural sentence and obtaining the target content vector of the natural sentence;
   determining, from at least one style vector according to a set target language style, a target style vector corresponding to the target language style, each of the at least one style vector corresponding to a language style; and
   inputting the target content vector and the target style vector into a first decoding model, and generating a styled sentence corresponding to the natural sentence.

2. The method according to claim 1, wherein the at least one style vector is obtained by classifying an input natural training sentence having a language style by the first encoding model when the first encoding model is obtained by training, and each natural training sentence having a language style corresponds to a style vector in the at least one style vector; and
   the determining, from at least one style vector according to a set target language style, a target style vector corresponding to the target language style comprises:
   selecting, from the at least one style vector, a style vector corresponding to each language style, to obtain at least two style vectors when the set target language style is a combination of at least two language styles; and
   fusing the at least two style vectors to obtain the target style vector.

3. The method according to claim 2, wherein the fusing the at least two style vectors to obtain the target style vector comprises:
   determining an average value of the at least two style vectors, and determining the average value as the target style vector.

4. The method according to claim 1, wherein:
   the first encoding model is obtained by training a second encoding model by a training model, wherein the training model is configured to train a classification capability of the second encoding model, to obtain the first encoding model;
   the first decoding model is obtained by training a second decoding model by the training model, wherein the training model is further configured to train a restoration capability of the second decoding model, to obtain the first decoding model; and
   the classification capability is classifying an input natural sentence into a corresponding content vector and style vector, and the restoration capability is restoring into the natural sentence according to the content vector and the style vector.

5. The method according to claim 1, wherein
   the language style corresponding to each of the at least one style vector is different from a style of the natural sentence.

6. A method for training a model by a computer device, the model including a first encoding model and a first decoding model, and the method comprising:
   inputting at least two natural training sentences in a corpus into a training model, and training a classification capability of a second encoding model by using the training model to obtain the first encoding model, each natural training sentence corresponding to a language style, and the classification capability being classifying the input natural training sentence into a corresponding content vector and style vector;
   obtaining at least one style vector outputted by the first encoding model when the first encoding model is obtained by training, each style vector being obtained by classifying the natural training sentence of a corresponding language style by the first encoding model; and
   training a restoration capability of a second decoding model by the training model to obtain the first decoding model when the at least two natural training sentences are inputted into the training model, wherein:
   the restoration capability is restoring into the natural training sentence according to the content vector and the style vector, and
   the content vector indicates a meaning of the natural training sentence, and the style vector indicates a language style of the natural training sentence.

7. The method according to claim 6, wherein:
   the training model comprises a first sub-model and a second sub-model;
   the first sub-model is established according to a preset supervision model; the first sub-model is configured to output a similarity between different content vectors according to a supervision capability of the supervision model;
   the supervision capability is determining a language style corresponding to a received content vector;
   the second sub-model is established according to the second encoding model and the second decoding model; and
   the second sub-model is configured to output, according to the second decoding model and a second encoding function, a probability that the natural sentence is restored.

8. The method according to claim 7, wherein the training a second encoding model by using the training model to obtain the first encoding model and the training a second decoding model by using the training model to obtain the first decoding model comprises:
   inputting m groups of first natural training sentences and second natural training sentences into the first sub-model to train the supervision capability of the supervision model, each group of the first natural training sentence and the second natural training sentence being natural training sentences having different language styles and having a same meaning, and m being a positive integer;
   stopping training when a number of training times reaches a preset number of times, to obtain a trained supervision model;
   updating the first sub-model in the training model by using the trained supervision model;
   inputting n groups of third natural training sentences and fourth natural training sentences into the training model, to train the second encoding model and the second decoding model and obtain a model training result, each group of the third natural training sentence and the fourth natural training sentence being natural training sentences having different language styles and having a same meaning, the model training result comprising a first result outputted by an updated first sub-model and a second result outputted by the second sub-model, and n being a positive integer; and stopping training in response to determining, according to the model training result, that a function model converges, to obtain the first encoding model and the first decoding model, the function model comprising a trained second encoding model and a trained second decoding model.

9. The method according to claim 8, wherein the inputting n groups of third natural training sentences and fourth natural training sentences into the training model, to train the second encoding model and the second decoding model comprises:

inputting the n groups of third natural training sentences and fourth natural training sentences into the second encoding model for classification, to obtain a style vector and a content vector that correspond to each group of the third natural training sentence and a style vector and a content vector that correspond to each group of the fourth natural training sentence;

inputting a content vector corresponding to a same group of the third natural training sentence and a content vector corresponding to the fourth natural training sentence into the trained supervision model to determine a similarity, to obtain the similarity between the content vector corresponding to the third natural training sentence and the content vector corresponding to the fourth natural training sentence;

inputting the content vector and a style vector that correspond to the same group of the third natural training sentence and the content vector and a style vector that correspond to the fourth natural training sentence into the second decoding model for restoration, to obtain a restored third natural training sentence and a restored fourth natural training sentence; and when the similarity between the content vector corresponding to the third natural training sentence and the content vector corresponding to the fourth natural training sentence, a probability that the restored third natural training sentence is the same as the third natural training sentence, and a probability that the restored fourth natural training sentence is the same as the fourth natural training sentence keep unchanged within the preset number of training times, stopping training in response to determining that the function model converges, to obtain the first encoding model and the first decoding model.

10. The method according to claim 8, wherein after the inputting n groups of third natural training sentences and fourth natural training sentences into the training model, to train the second encoding model and the second decoding model, the method further comprises:

continuing to execute the operation of inputting m groups of first natural training sentences and second natural training sentences into the first sub-model to train the supervision capability of the supervision model in response to determining, according to the model training result, that the function model does not converge.

11. A non-transitory computer-readable storage medium storing computer program instructions executable by at least one processor to perform:

obtaining a to-be-converted natural sentence;

inputting the natural sentence into a first encoding model having a classification capability of classifying the natural sentence into a target content vector and a style vector of the natural sentence, the target content vector indicating a meaning of the natural sentence, and the style vector of the natural sentence indicating a language style of the natural sentence;

according to an output of the first encoding model, removing the style vector of the natural sentence and obtaining the target content vector of the natural sentence;

determining, from at least one style vector according to a set target language style, a target style vector corresponding to the target language style, each of the at least one style vector corresponding to a language style; and inputting the target content vector and the target style vector into a first decoding model, and generating a styled sentence corresponding to the natural sentence.

12. The non-transitory computer-readable storage medium according to claim 11, wherein the at least one style vector is obtained by classifying an input natural training sentence having a language style by the first encoding model when the first encoding model is obtained by training, and each natural training sentence having a language style corresponds to a style vector in the at least one style vector; and the determining, from at least one style vector according to a set target language style, a target style vector corresponding to the target language style comprises:

selecting, from the at least one style vector, a style vector corresponding to each language style, to obtain at least two style vectors when the set target language style is a combination of at least two language styles; and fusing the at least two style vectors to obtain the target style vector.

13. The non-transitory computer-readable storage medium according to claim 12, wherein the fusing the at least two style vectors to obtain the target style vector comprises:

determining an average value of the at least two style vectors, and determining the average value as the target style vector.

14. The non-transitory computer-readable storage medium according to claim 11, wherein:

the first encoding model is obtained by training a second encoding model by a training model, wherein the training model is configured to train a classification capability of the second encoding model, to obtain the first encoding model;

the first decoding model is obtained by training a second decoding model by the training model, wherein the training model is further configured to train a restoration capability of the second decoding model, to obtain the first decoding model; and the classification capability is classifying an input natural sentence into a corresponding content vector and style vector, and the restoration capability is restoring into the natural sentence according to the content vector and the style vector.

15. The non-transitory computer-readable storage medium according to claim 11, wherein the first encoding model and the first decoding model are parts of a model, and the model is trained by:
  inputting at least two natural training sentences in a corpus into a training model, and training a classification capability of a second encoding model by using the training model to obtain the first encoding model, each natural training sentence corresponding to a language style, and the classification capability being classifying the input natural training sentence into a corresponding content vector and style vector;
  obtaining at least one style vector outputted by the first encoding model when the first encoding model is obtained by training, each style vector being obtained by classifying the natural training sentence of a corresponding language style by the first encoding model; and
  training a restoration capability of a second decoding model by the training model to obtain the first decoding model when the at least two natural training sentences are inputted into the training model, wherein:
  the restoration capability is restoring into the natural training sentence according to the content vector and the style vector, and
  the content vector indicates a meaning of the natural training sentence, and the style vector indicates a language style of the natural training sentence.

16. The non-transitory computer-readable storage medium according to claim 15, wherein:
  the training model comprises a first sub-model and a second sub-model;
  the first sub-model is established according to a preset supervision model; the first sub-model is configured to output a similarity between different content vectors according to a supervision capability of the supervision model;
  the supervision capability is determining a language style corresponding to a received content vector;
  the second sub-model is established according to the second encoding model and the second decoding model; and
  the second sub-model is configured to output, according to the second decoding model and a second encoding function, a probability that the natural sentence is restored.

17. The non-transitory computer-readable storage medium according to claim 16, wherein the training a second encoding model by using the training model to obtain the first encoding model and the training a second decoding model by using the training model to obtain the first decoding model comprises:
  inputting m groups of first natural training sentences and second natural training sentences into the first sub-model to train the supervision capability of the supervision model, each group of the first natural training sentence and the second natural training sentence being natural training sentences having different language styles and having a same meaning, and m being a positive integer;
  stopping training when a number of training times reaches a preset number of times, to obtain a trained supervision model;
  updating the first sub-model in the training model by using the trained supervision model;
  inputting n groups of third natural training sentences and fourth natural training sentences into the training model, to train the second encoding model and the second decoding model and obtain a model training result, each group of the third natural training sentence and the fourth natural training sentence being natural training sentences having different language styles and having a same meaning, the model training result comprising a first result outputted by an updated first sub-model and a second result outputted by the second sub-model, and n being a positive integer; and
  stopping training in response to determining, according to the model training result, that a function model converges, to obtain the first encoding model and the first decoding model, the function model comprising a trained second encoding model and a trained second decoding model.

18. The non-transitory computer-readable storage medium according to claim 17, wherein the inputting n groups of third natural training sentences and fourth natural training sentences into the training model, to train the second encoding model and the second decoding model comprises:
  inputting the n groups of third natural training sentences and fourth natural training sentences into the second encoding model for classification, to obtain a style vector and a content vector that correspond to each group of the third natural training sentence and a style vector and a content vector that correspond to each group of the fourth natural training sentence;
  inputting a content vector corresponding to a same group of the third natural training sentence and a content vector corresponding to the fourth natural training sentence into the trained supervision model to determine a similarity, to obtain the similarity between the content vector corresponding to the third natural training sentence and the content vector corresponding to the fourth natural training sentence;
  inputting the content vector and a style vector that correspond to the same group of the third natural training sentence and the content vector and a style vector that correspond to the fourth natural training sentence into the second decoding model for restoration, to obtain a restored third natural training sentence and a restored fourth natural training sentence; and
  when the similarity between the content vector corresponding to the third natural training sentence and the content vector corresponding to the fourth natural training sentence, a probability that the restored third natural training sentence is the same as the third natural training sentence, and a probability that the restored fourth natural training sentence is the same as the fourth natural training sentence keep unchanged within the preset number of training times, stopping training in response to determining that the function model converges, to obtain the first encoding model and the first decoding model.

* * * * *